(12) United States Patent
Marya (10) Patent No.: US 12,449,349 B2
(45) Date of Patent: Oct. 21, 2025

(54) TREND-BASED COLORIMETRIC ANALYSIS TECHNIQUES FOR FIELD COMPONENT AND TOOL STRING DIAGNOSTICS

(71) Applicant: Schlumberger Technology Corporation, Sugar Land, TX (US)

(72) Inventor: Manuel Marya, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 528 days.

(21) Appl. No.: 17/938,206

(22) Filed: Oct. 5, 2022

(65) Prior Publication Data

US 2024/0118190 A1    Apr. 11, 2024

(51) Int. Cl.
*G01N 21/25* (2006.01)
*E21B 47/002* (2012.01)
*G01J 3/46* (2006.01)
*G01N 21/88* (2006.01)

(52) U.S. Cl.
CPC ......... *G01N 21/251* (2013.01); *E21B 47/002* (2020.05); *G01J 3/46* (2013.01); *G01J 2003/467* (2013.01); *G01N 21/8851* (2013.01)

(58) Field of Classification Search
CPC .............. G01N 21/8851; G01N 21/251; E21B 47/002; G01J 3/46; G01J 2003/467; G06T 7/0002; G06T 2207/30136; G06T 2207/10024; G02B 26/10
See application file for complete search history.

(56) References Cited

U.S. PATENT DOCUMENTS

| 4,800,165 A | * | 1/1989 | Oka | G01N 17/02 |
| | | | | 422/53 |
| 5,568,266 A | * | 10/1996 | Ciza | G01J 3/0291 |
| | | | | 356/402 |

(Continued)

FOREIGN PATENT DOCUMENTS

EP    3058312 B1    6/2019

OTHER PUBLICATIONS

P. Felton, M.J. Schofield, 1998, Understanding the High Temperature Corrosion Behaviour of Modified 13%Cr Martensitic OCTG, Paper No. 99, Corrosion98, NACE International.(8 pages).

(Continued)

*Primary Examiner* — Andrew Schechter
*Assistant Examiner* — Brandon George Macgregor
(74) *Attorney, Agent, or Firm* — Jeffrey D. Frantz (57) ABSTRACT

The present disclosure relates to a method. The method includes receiving, via one or more processors, colorimetric data corresponding to a portion or integrality of a surface of a field component. The method also includes determining, via the one or more processors, a color value associated with the surface. Further, the method includes retrieving, via the one or more processors, trend data indicating relationships between a plurality of color values and a plurality of conditions corresponding to the field component. Further still, the method includes determining, via the one or more processors, a condition of the plurality of conditions correspond to the field component based on the trend data and the color value. Even further, the method includes generating, via the one or more processors, a condition output based on the determined condition.

20 Claims, 7 Drawing Sheets

(56) References Cited

U.S. PATENT DOCUMENTS

| | | | |
|---|---|---|---|
| 2006/0142945 A1* | 6/2006 | McLaughlin | E21B 47/007 702/9 |
| 2006/0288756 A1* | 12/2006 | De Meurechy | G01N 21/49 73/1.01 |
| 2011/0150326 A1* | 6/2011 | Jeong | G06T 7/0004 382/162 |
| 2017/0294008 A1* | 10/2017 | Torres | G06T 7/001 |
| 2017/0358106 A1* | 12/2017 | Yoshimura | G06T 7/0012 |
| 2019/0064096 A1* | 2/2019 | Sharma | G01N 27/20 |
| 2020/0175667 A1* | 6/2020 | Morris | H04N 23/70 |
| 2020/0211175 A1* | 7/2020 | Kunik | G01N 21/95 |
| 2021/0272262 A1* | 9/2021 | Horita | G01M 5/0008 |
| 2021/0325296 A1* | 10/2021 | Minamitani | G06F 18/24 |
| 2022/0156914 A1* | 5/2022 | Ono | G06V 10/764 |
| 2022/0205926 A1* | 6/2022 | Yang | G01N 21/8851 |
| 2023/0086904 A1 | 3/2023 | Marya et al. | |
| 2023/0112828 A1* | 4/2023 | Horita | G06T 7/0004 356/237.1 |
| 2023/0360187 A1* | 11/2023 | Bugovics | G01B 11/24 |

OTHER PUBLICATIONS

Chen et al., (2018) New Insight Into the Mechanisms of Iron Sulfide Deposition in Carbonate Reservoir During Acid Stimulation, NACE-2018-11141, presented at the Corrosion 2018, Apr. 15-19, 2018 (12 pages).

* cited by examiner

ND-BASED COLORIMETRIC ANALYSIS
TECHNIQUES FOR FIELD COMPONENT
AND TOOL STRING DIAGNOSTICS

BACKGROUND

The subject matter disclosed herein relates to systems and methods for assessing the damage of component surfaces using trend-based colorimetric analysis techniques. More specifically, the subject matter disclosed herein relates to trend-based colorimetric analysis techniques to identify changes over time of optical properties of materials, including surface treatments and coatings, and generate a condition output or component use output related to a functional lifetime for one or more mechanical components. The changes in colorimetric data from an initial state to subsequent states may be the results of corrosion and/or wear, or combinations, and are indicative of component and tool remaining useful life.

A mechanical component, having coated and/or uncoated surfaces, may suffer damage over time through the degradation on one or more of its surfaces due to exposure to corrosive and/or wear conditions. The mechanical component may be intended for midstream oil and gas operations (e.g., processing, storing, and/or transporting of oil, natural gas, and natural gas liquids), upstream oil and gas operations (e.g., exploration, drilling, production, or extraction), or other applications such as water injection, or underground gas storage such as geological carbon sequestration and depleted reservoir hydrogen storage, among others. In oil and gas and related applications, these so-called field components are typically subjected to a variety of harsh environmental conditions involving various single or multiphase fluids, among production fluids, contaminated water or brines, acid gases, among others, all subjected to direct or indirect subterranean temperatures and pressures. These harsh environmental conditions can induce various forms of corrosion at the surface of materials, whether bare, treated with surface treatments, or covered with coatings that may be intended to add functionalities such as friction reduction, wear resistance, or protection against the environments of use. Unfortunately, in oil and gas and related applications, it remains challenging to manage the deleterious effects of such harsh environmental conditions on the mechanical components, because the conditions vary over time, the mechanical components are typically in difficult to access locations such as downhole or subsea environments, and common inspection techniques may be inaccurate, intrusive, and only offer an assessment of the component at a single point in time as opposed to continuously for instance

BRIEF DESCRIPTION

Certain embodiments commensurate in scope with the originally filed claims are summarized below. These embodiments are not intended to limit the scope of the present inventive technology, but rather these embodiments are intended only to provide a brief summary of possible forms of the technology. Indeed, the present system and method may encompass a variety of forms that may be similar to or different from the embodiments set forth below.

In certain embodiments, the present disclosure relates to a method. The method includes receiving, via one or more processors, colorimetric data corresponding to a portion or integrity of a surface of a field component. The method also includes determining, via the one or more processors, a color value associated with the surface. Further, the method includes retrieving, via the one or more processors, trend data indicating relationships between a plurality of color values and a plurality of conditions corresponding to the field component. Further still, the method includes determining, via the one or more processors, a condition of the plurality of conditions correspond to the field component based on the trend data and the color value. Even further, the method includes generating, via the one or more processors, a condition output based on the determined condition.

In certain embodiments, the present disclosure relates to a method. The method includes obtaining, via one or more processors, sensor input of a color of a portion or integrity of a surface of a component. The method also includes comparing, via the one or more processors, the color to a color reference. Further, the method includes identifying, via the one or more processors, a condition of the surface of the component based on the comparison. Further still, the method includes outputting, via the one or more processors, an indication of the condition.

In certain embodiments, the present disclosure relates to a system. The system includes a controller having one or more processors configured to obtain sensor input of a color of a surface of a component. The one or more processors are also configured to compare the color to plurality of reference colors corresponding to a plurality of conditions. Further, the one or more processors are configured to identify a condition of the plurality of conditions correspond to the surface of the component based on the comparison. Further still, the one or more processors are configured to output an indication of the condition.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described next. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various examples of the present disclosure, the articles "a," "an," "the," and "said" are intended to mean that there are one or more of the elements. The terms "comprising," "including," and "having" are intended to be inclusive and mean that there may be additional elements other than the listed elements. Additionally, it should be understood that references to "one example" or "an example" of the present disclosure are not intended to be interpreted as excluding the existence of additional examples that also incorporate the recited features.

In the present context, the term "about" or "approximately" is intended to mean that the values indicated are not exact and that the actual value may vary from those indicated in a manner that does not materially alter the operation concerned. For example, the term "about" or "approximately" as used herein is intended to convey a suitable value that is within a particular tolerance (e.g., ±10%, ±5%, ±1%, ±0.5%), as would be understood by one skilled in the art.

As discussed in detail below, the disclosed embodiments include systems and methods for inspecting field component and field component materials based on optical properties, such as color changes, associated with certain material degradation and/or exposures to harsh conditions of use. Mechanical components of industrial use, including in the oil and gas industry or the Energy sector (also referred as field components), will experience over time one or more form of degradation from one of more of its surfaces. The one or more materials making the component, including surface treatments and coatings, may concurrently experience various forms of degradation due to evolving environmental conditions, for instance the exposure to acids, then the exposure to abrasive and erosive conditions also causing the gradual loss of materials. The degradation may include corrosion, most commonly captured by a mass or thickness loss, the formation of scale deposits, some chemical absorption, as commonly seen with polymeric materials, or any other form of degradation of the materials, including treated surfaces and coatings. The mechanical components may broadly include tools, tool subassemblies, general tubing and casing, couplings, liners, or valves and may be located at surface, subsea, or underground and be part of oil and gas, geothermal, gas storage infrastructures, among others. For example, in the oil and gas and related industry, the mechanical components may more specifically include wellheads, Christmas trees, valves, chokes, blowout preventers (BOPs), tubing hangers, casing hangers, running tools, pipes, pumps, compressors, pigs, machined components, conveyance components, oilfield asset components, or any combination thereof. Each of these mechanical components may include a coating and/or a material surface that provides certain benefits, such as enhanced corrosion resistance, mechanical wear resistance, scale mitigation, and so on. At least in some instances, the coating and/or the material surface may be formed of a metal, alloy (from various metals and non-metals), or ceramic-like surface. For example, the coatings may include corrosion or wear resistant surface treatments and coatings, such as nickel and other transition-metal plating and electroplating, diffusion treatments such as nitriding, nitrocarburizing and the like, or boronizing and the like. As another non-limiting example, the coatings may include general protective coatings, for instance zinc plating, as may be found at the surface of carbon and low alloys steel accessories, or wireline cable for reservoir evaluation or casing integrity tools.

Unfortunately, the harsh conditions typically present downhole or in subsea environments may cause corrosion of the material surface, including material with any potential surface treatment or coatings. Among the many potential forms of corrosion, common forms of corrosion include general corrosion, wherein the corrosion results in weight loss and proceed approximately uniformly over a surface, and localized corrosion, which commonly includes pitting and crevice corrosion. Galvanic corrosion, erosion corrosion, intergranular corrosion, exfoliation corrosion, microbial corrosion, chloride stress corrosion, sulfide stress cracking, and combinations also lead to various types of more or less visible and impactful damage. In cases, a coating may be protective of its underling material for some time, beyond which failure of the coatings can induce accelerated corrosion underneath and potentially a reduced component useful life. When a coating fails, typically by corroding away and/or separating from its mechanical component after some limited uniform or localized corrosion, the underlying material surface becomes exposed, and the damage may evolve from one type to another.

The downhole conditions can also cause other deleterious effects to the component surface, including material with any potential surface treatment or coatings. For example, the harsh conditions may also lead to the formation of adherent scale that may gradually buildup on the surface of the component and produce an undesirable reduction in flow, potentially blockage. Common examples of scale found downhole include calcite or calcium carbonate, barium sulfates, iron sulfides, silicates, wax and asphaltenes; another example of scale found in cold subsea environment is methane hydrate. Further, the downhole conditions may include the presence of chemical species, particularly gases that can be absorbed by a surface of the component and may adversely affect operations or service quality. For example, a material surface and/or a coating may absorb hydrogen, hydrogen sulfide ($H_2S$), or mercury ($Hg$) and as a result suffer some undesirable change leading to a component reduced useful life, and/or alternatively remove certain chemistry from a highly desirable fluid. In downhole fluid sampling and analyses for instance, it should be noted that the removal from a fluid by a tool string, tool, or component surface is highly undesirable as it subsequently influences reported fluid composition, and shed some doubt on the accuracy and quality of the fluid sampling reporting.

For these reasons, the harsh conditions may gradually degrade the component surface, its material and coatings, and ultimately, lead to failure of the field component. It should be noted that the optical properties of the component materials, including coatings, are likely to change following exposures to the harsh conditions. For instance, a surface that is initially metallic gray or gold in appearance may gradually or suddenly go through a spectrum of colors, commonly towards a darker color such as black, less commonly towards a brighter color, or a brighter color and then a darker color such as black. As such, monitoring changes over time in the optical properties may provide a technique for monitoring the effects of harsh conditions on the component material surface and/or its coating or surface treatments. However, despite the benefits of detecting the change in optical properties, implementing techniques for detecting the change in optical properties on the component material surface in downhole operations may be difficult. For example, it may be challenging for a person to observe or discern such optical property changes with their eyes, as their eyes commonly lack the required sensitivity to discern relevant changes in the optical properties.

Accordingly, the disclosed embodiments are directed to trend-based colorimetric analysis techniques to improve monitoring changes in optical properties of a surface portion (e.g., a coating and/or a material surface) of a mechanical component resulting from corrosion, chemical scavenging, moisture exposure, and/or other forms of degradation. In general, the disclosed trend-based colorimetric analysis techniques include generating a condition output based on the change in the optical properties of the surface portion and trend data. As described in more detail herein, the trend data include data that generally indicates how the optical properties of the surface portion changes over a functional lifetime of the field component. As referred to herein, the "functional lifetime" refers a time period corresponding to use of the field component during various operations, such as runs (e.g., an instance of drilling, an instance of performing gas sequestration, and the like). In some embodiments, the trend data may include a colorimetric profile for a particular type of material of the surface portion, such as graphs, mathematical functions, lookup tables, and computer models indicating a relationship (e.g., a linear, a non-linear, monotonic, non-monotonic, and the like) between the color and various conditions of the material of the surface portion. The conditions may include corrosion or other forms of degradation, including various types of corrosion or degradation, severity or degree of corrosion or degradation, expected remaining useful life, or any combination thereof. It is presently recognized that certain materials used to coat, form, or otherwise be integrated with field component surfaces may have optical properties (e.g., colors) that change in a relatively complex manner (e.g., an optical density does not change linearly with time or use) and/or a manner that may be undetectable by the naked eye. Accordingly, utilizing the trend data to determine the condition output may provide more contextual information for the change in color of the surface portion of the field component, thereby improving the accuracy of determining whether field components should be repaired, replaced, or otherwise taken out of service.

Figure 1:
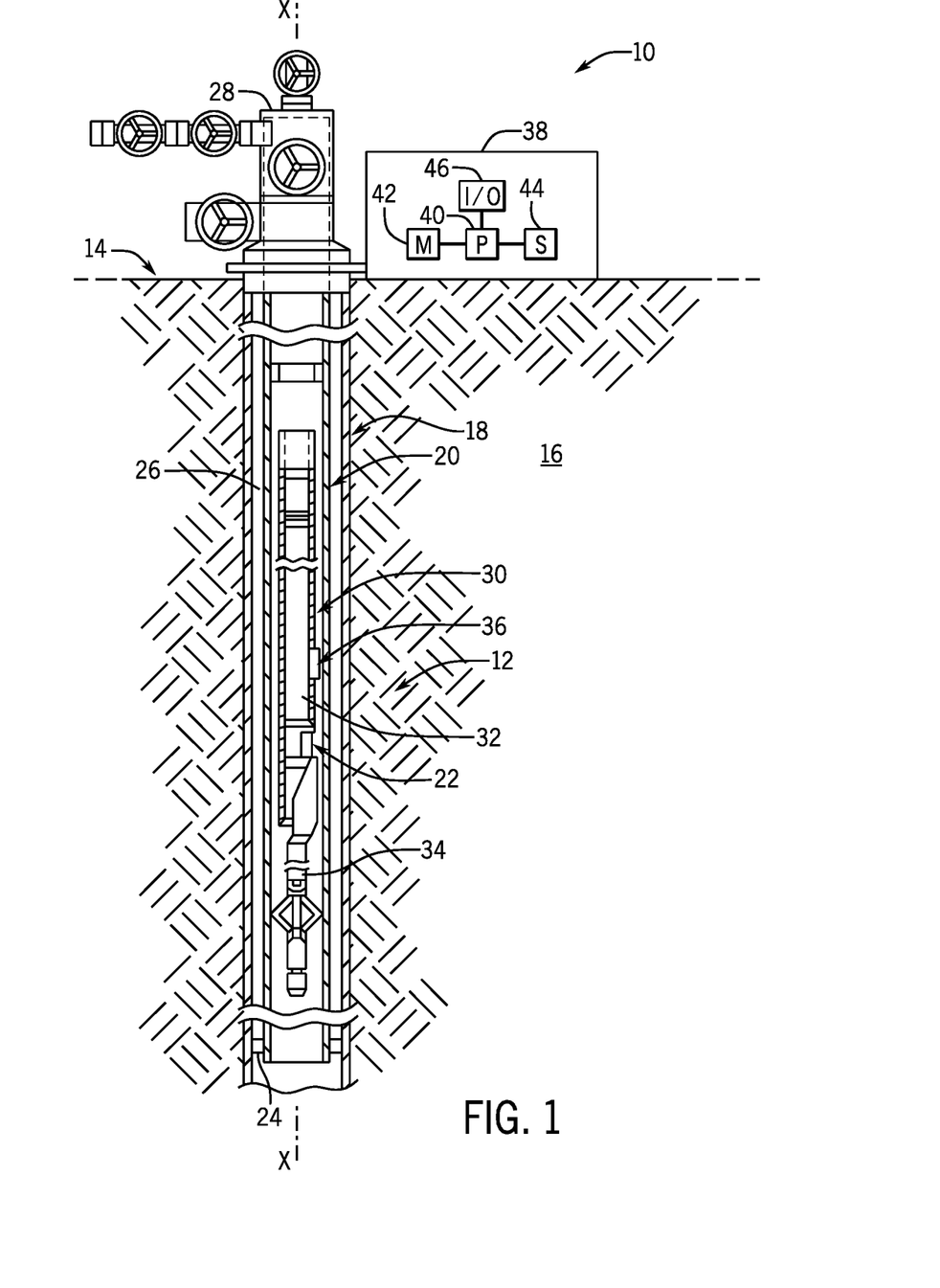
FIG. 1 is a schematic diagram of a wellsite where a corrosion detection coating may be employed, in accordance with the present disclosure.

With foregoing in mind, FIG. 1 illustrates a well system 10, where the trend-based colorimetric analysis techniques may be implemented. The well system 10 may be a hydrocarbon (e.g., oil and/or gas) production well system, a carbon sequestration well system, a water injection well system, an underground gas storage well system, or another suitable well system. In a well system 10, one or multiple well components 12 may be lowered into a wellbore 14 (e.g., installed and anchored within the wellbore 14) prior to certain operations, such as well production. The well component 12 may be lowered into the wellbore 14 as a first installation, to replace a previously installed well component 12, or to add an additional well component 12. In any case, the well component 12 is configured to control flow from the reservoir, such that it only goes in at the specific manage points (e.g., perforations, valves, and the like). For example, the well component 12 may block a flow of formation fluid from reaching a surface located above a geological formation 16 (e.g., via conduits such as a casing conduit 18 and/or a production tubing 20), which flow may result from high pressure conditions that arise during well production. The well component 12 may include a valve 22, such as a subsurface valve. For example, the valve 22 may include a gate valve, a ball valve, a check valve, or any combination thereof. As shown in this configuration of the wellbore 14, the wellbore completion includes a casing conduit 18 and a production casing conduit 20 (e.g., production tubing) with an annular sealing element 24 (e.g., metal and/or elastomeric seal) that seals an annular space 26 defined between the casing conduit 18 and the production casing conduit 20. The wellbore 14 may include a wellhead 28 at the surface of the well system 10 that may selectively seal the casing conduit 18 and/or the production casing conduit 20.

In the illustrated example of FIG. 1, the well component 12 includes a valve housing 30 having a valve 22, an actuation subsystem 32 (e.g., an actuator), and a valve controller 34. The well component 12 is sealed in the production tubing by a sealing element, so that the fluid may not reach the surface if it does not pass through the valve 22. The valve 22 includes a flapper that can switch between an open position to enable fluid flow and a closed position to block the fluid flow. The actuation subsystem 32 includes a biasing component 36 (e.g., a pressurization piston coupled to a spring) to maintain the valve 22 in a default position (e.g., open or closed). The valve controller 34 is configured to control and/or adjust a position of components of the well component 12 (e.g., the valve 22) via the actuation subsystem 32 to block the flow of formation fluid from reaching the surface or to enable the fluid to flow toward the surface. In certain embodiments, the valve 22 and/or one or more additional valves may be used to control fluid flow from the surface to a downhole location, such as by injecting one or more fluids (e.g., carbon dioxide).

The actuation subsystem 32 and the valve housing 30 may be configured to operate with or without use of hydraulic or electrical control lines extending from the surface into the wellbore 14. For example, electrical power and/or hydraulic pressure may be provided from the surface using one or more electrical generators, a power grid, batteries, hydraulic pumps, or a combination thereof. Additionally, or alternatively, the actuation subsystem 32 may be powered by one or more local power supplies, such as a battery pack, at the location of the valve 22.

The illustrated embodiment of the well component 12 includes the valve controller 34 that may be utilized to adjust the position of the components in the valve housing 30. The valve controller 34 controls and/or adjusts a position of the valve 22 between open and closed positions (e.g., via the actuation subsystem 32). For example, the valve controller 34 may control and/or adjust the valve 22 based on signals that are conveyed by a transmitter of a transmitter subsystem 38.

In some embodiments, the transmitter subsystem 38 may receive sensor measurements (e.g., temperature sensor measurements, pressure sensor measurements, flow-rate sensor measurements, another suitable parameter, or any combination thereof). The sensor measurements may be directed by surface sensors, downhole sensors, or completion sensors to the transmitter subsystem 38 via any suitable telemetry (e.g., via electrical signals pulsed through the geological formation 16 or via mud pulse telemetry). In some embodiments, the transmitter subsystem 38 may receive inputs from a user interface controlled by an operator. The transmitter subsystem 38 may process the sensor measurements and/or user inputs to determine a condition within the wellbore 14 or at the surface and determine whether to adjust the position of the valve 22 based on the condition.

To this end, the transmitter subsystem 38 may be any electronic data processing system that can be used to carry out the systems and methods of this disclosure. For example, the transmitter subsystem 38 may include a processor 40 which may execute instructions stored in memory 42 and/or storage 44. As such, the memory 42 and/or the storage 44 of the transmitter subsystem 38 may be any suitable article of manufacture that can store the instructions. In some embodiments, the memory 42 is a tangible, non-transitory, machine-readable-medium that may store machine-readable instructions for the processor 40 to execute. The memory 42 may include ROM, flash memory, a hard drive, or any other suitable optical, magnetic, or solid-state storage medium, or a combination thereof. The memory 42 may store data, instructions, and any other suitable data. Additionally, the transmitter subsystem 38 may include an input/output (I/O) port 46, which may include interfaces coupled to various components such as input devices (e.g., keyboard, mouse), input/output (I/O) modules, sensors (e.g., surface sensors and/or downhole sensors), and the like. For example, the I/O port 46 may include a display (e.g., an electronic display) that may provide a visualization, a well log, or other operating parameters of the geological formation 16, the wellbore 14, or the surface to an operator, for example. In this embodiment, the transmitter subsystem 38 (e.g., data processing system) has been represented at the well site. However, all or part of the transmitter subsystem 38 (e.g., all or part of the processor, the display, the memory, etc.) may be situated remotely from the well site and configured to communicate with the well site via a network connection. It should be noted that, at least in some instances, all or part of the data processing system may be cloud-based. While the description above generally relates to a well system 10, the trend-based colorimetric techniques may also be used for detecting conditions in mechanical components used for other oil and gas operations, other industries, and/or any type of material conditions exhibiting changes in optical properties.

Figure 2:
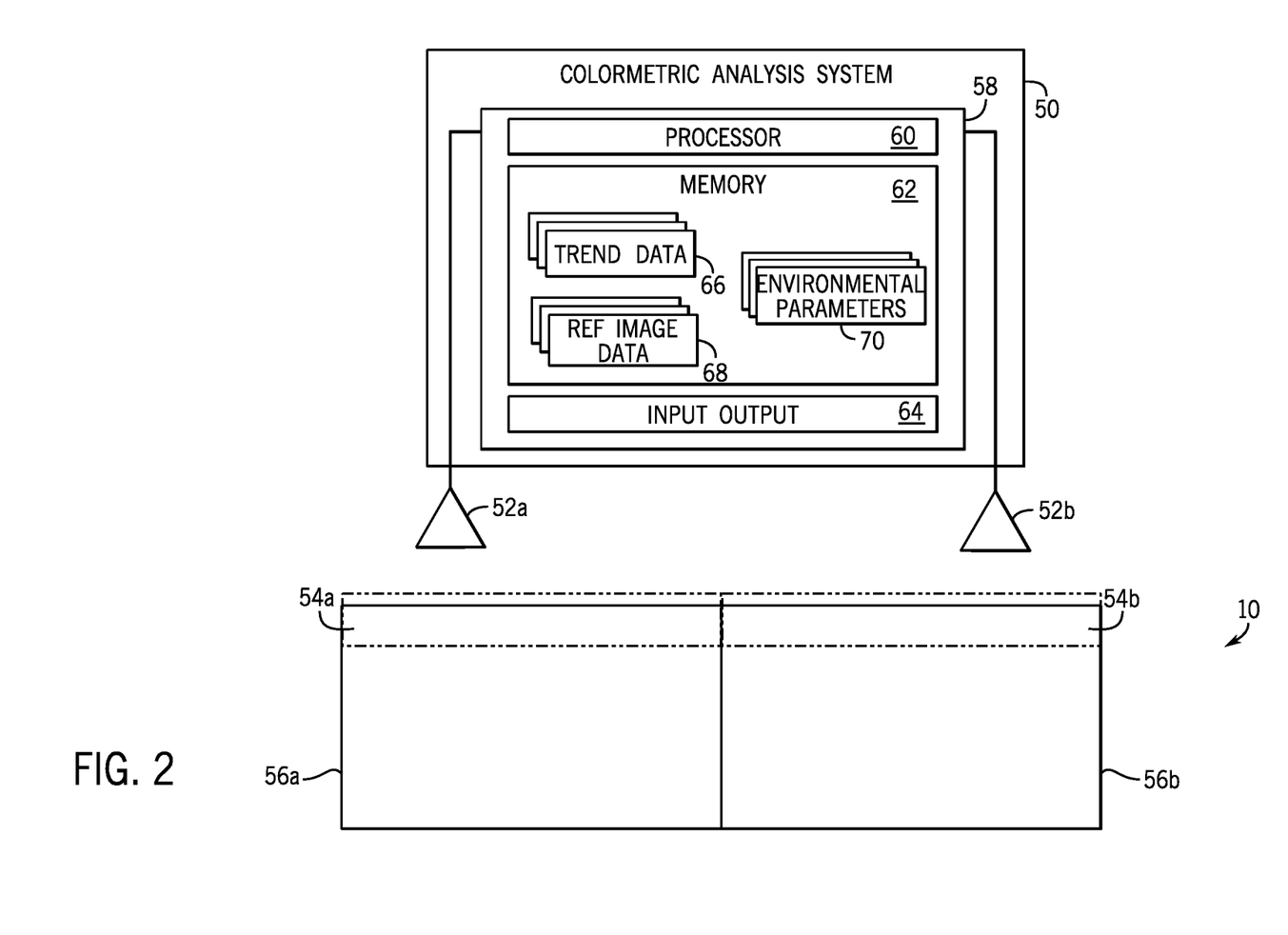
FIG. 2 is a block diagram of an embodiment of a colorimetric analysis system, in accordance with the present disclosure.

As described herein, the trend-based colorimetric techniques may be used to generate a condition output, such as a control signal that modifies operation of the well system 10, such as halting operation, and/or alerts a user that a component of the well system 10 needs to be replaced or repaired. To illustrate how the condition output may be generated, FIG. 2 is a diagram of an embodiments of a colorimetric analysis system 50 configured to generate the condition output based on a detected change in the optical properties of a material of a mechanical component. As referred to herein, a "change in an optical property" may include one or more of a change in a color, a hue, a reflectance, a transmission, a polarization, an absorption, or a luminescent capability of a material.

The colorimetric analysis system 50 generally includes one or more optical sensors 52 configured to measure or detect one or more optical properties of a surface portion 54 (e.g., a coating or outer surface formed of a material) of a field component 56. In some embodiments, the optical sensors 52 may include colorimeters, spectrometers, other light detectors and analyzers, including sensitive cameras among other suitable devices capable of generating colorimetric data indicative of the composition of the surface portion 54 of the field component 56. When the optical sensor is selected to be a camera, it may be able to produce two-dimensional spatial representation of colorimetric data, as opposed to average single colorimetric data produced by normal calorimeter and spectrometric apparatus. In some embodiments, the field component 56 may be made of ferrous alloys (including carbon and low-alloy steels and stainless steels), nickel alloys, cobalt alloys, titanium alloys, copper alloys (particularly spinodal alloys), nitrided alloys, metallic coatings, polymer coatings, ceramic coatings, and combination thereof, or other metallic materials with the minimum required mechanical properties for normal application use. In some embodiments, the field component 56 may be supplemented by surface treatments, particularly nitriding and nitrocarburizing, coatings such as electroless nickel plating and the likes, or non-metallic coatings and surfaces such as thermoplastic coatings. In general, the optical sensors 52 when represented by a digital camera may have a sufficient color sensitivity and resolution for imaging the outer surface of the oil field component 56. In some embodiments, the colorimetric analysis system 50 may be capable of receiving visual inspection data, and thus, inputs corresponding to a visual inspection provided by a user. The visual inspection data may be used to verify the colorimetric data, sensor data, or image data obtained by the colorimetric analysis system.

The sensor data (e.g., colorimetric data, sensor input) generated by the optical sensor(s) 52 may be output to a computing device 58 (e.g., computer, controller, monitoring system, etc.) having a processor 60, which may execute instructions stored in memory 62 and/or storage media, or based on inputs provided from a user via the input/output (I/O) device 64. The memory 62 and/or the storage media may be read-only memory (ROM), random-access memory (RAM), flash memory, an optical storage medium, or a hard disk drive, to name but a few examples. For example, in operation, the processor 60 may receive the sensor data, colorimetric data, sensor input, or other colorimetric measurement, determine that the optical properties of the surface portion 54 of the field component 56 have changed above a threshold indicating corrosion, chemical scavenging, and the like, and send an alert or suitable control signals to take a corrective action. In general, the processor 60 may determine the optical properties by analyzing colorimetric data and determining a numerical representation of the optical properties. For example, the processor 60 may determine optical properties on a scale from 1 to 100 corresponding to range of colors of the field component due to different conditions. As another non-limiting example, the processor 60 may determine a color value corresponding to measured spectrum (i.e., between a wavelength range, such as the visible wavelength range between 380 nm and 750 nm) of the field component.

In the illustrated embodiment, the memory 62 includes trend data 66 and reference sensor data 68. In general, the trend data 66 includes trend information corresponding to a field component 56 that indicates how the optical properties of the field component 56 may change or vary during the functional lifetime of the field component 56. For example, and as described herein and in further detail with respect to FIGS. 4-6, the trend data may include a colorimetric profile for a particular type of material of the surface portion, such as graphs, mathematical functions, lookup tables, and models indicating a relationship between a condition of the field component 56 (i.e., the material surface or coating of the field component 56) and the color of the particular type of material of the surface portion. In general, the relationship may indicate how the optical properties (e.g., color) of the material surface and/or coating of the field component 56 may change for different conditions of the coating, such as adsorption of different chemical species, corrosion of the coating, and/or removal of the coating, as described in more detail with respect to FIGS. 4-6. For example, the trend data 66 may indicate how the color of the field component 56 changes due to different exposures of water, brines, water having a relatively acidic pH, water having a relatively basic pH, water with hydrogen sulfide and/or carbon dioxide, the surface of the field component 56 completely corroding, and so on. For example, the trend data 66 may indicate a non-linear trend of color values corresponding to the surface of the field component and corrosion of the field component, as described in more detail with respect to FIGS. 3 and 4. In general, the reference sensor data 68 may include previously acquired colorimetric data generated by the optical sensors 52 and/or colorimetric data obtained by external optical sensors (e.g., lab measurements). The processor 60 may compare the sensor data generated by the optical sensors 52 with the reference sensor data 68 to determine the change in the optical properties of the field component 56 based on a discrepancy between the sensor data and the reference sensor data 68. Additionally, or alternatively, the processor 60 may utilize the trend data to determine the condition output indicative of the functional lifetime of the field component.

In the illustrated embodiment, the memory 62 also includes environmental parameters 70. In general, the environmental parameters 70 may include data indicating a composition of a surrounding geological formation 16 at a location of the field component 56. For example, the environmental parameters 70 may include data indicating a type of fluid, particularly aqueous fluid containing hydrogen sulfide, carbon dioxide, chlorides, and so on, that may be present in the geological formation 16.

In general operation of the illustrated embodiment, the processor 60 of the colorimetric analysis system 50 may send one or more control signals that cause the optical sensors 52 (e.g., optical sensor 52a and/or optical sensor 52b) to activate and generate colorimetric data of the surface portion 54 of the field component 56. For example, as illustrated the colorimetric analysis system 50 includes two optical sensors 52a and 52b (e.g., collectively 52). The optical sensor 52a is positioned to obtain a first colorimetric data of a first surface portion 54a and the optical sensor 52b is positioned to obtain a second colorimetric data of a second surface portion 54b. Accordingly, in an embodiment when the processor 60 sends a control signal to both optical sensors 52a and 52b, the processor 60 may receive the first colorimetric data of the first surface portion 54a and the second colorimetric data of the second surface portion 54b. In some embodiments, the processor 60 may store the first colorimetric data and/or the second colorimetric data in the memory 62 of the computing device 58. For example, the processor 60 may store the first colorimetric data and/or the second colorimetric data in the memory 62 as reference sensor data 68 to use for operations discussed in further detail herein. In any case, the processor 60 may generate a condition output, a component use output, or both, using the first colorimetric data and/or the second colorimetric data. As another non-limiting example, the processor 60 may send control signals that cause multiple optical sensors 52 to activate and generate colorimetric data of different areas the same surface (e.g., a first area on corresponding to a first longitudinal area of the field component and a second area corresponding to a second longitudinal area of the field component, areas on different sides of the field component, and so on). As another non-limiting example, the processor 60 may send control signals that cause multiple optical sensors 52 to activate and generate multiple colorimetric data of the same area of the surface, and generate an average color or image based on the multiple sensor data (e.g., which may improve the accuracy of measuring colors or obtaining the images).

Figure 3:
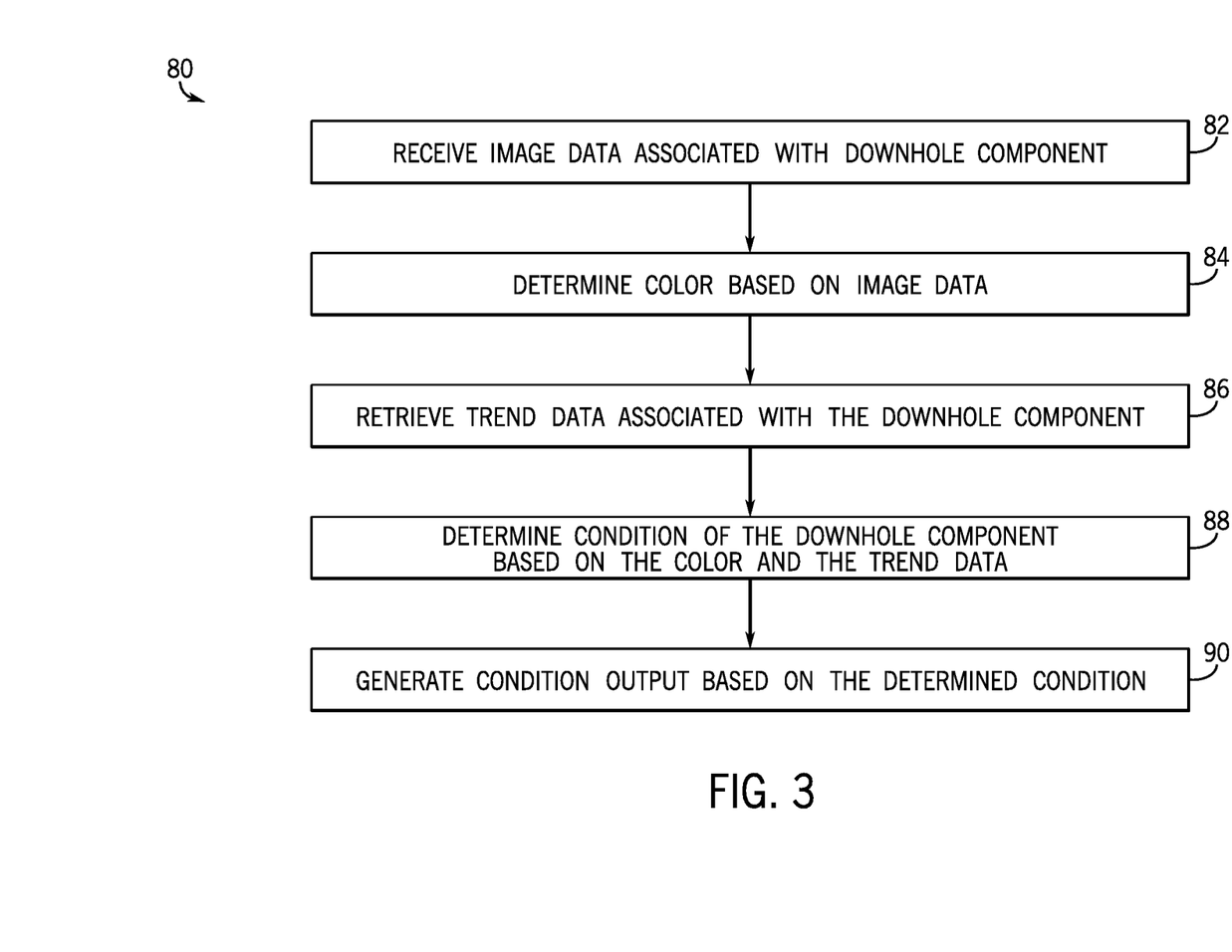
FIG. 3 is a flow diagram of an embodiment of a process for generating a condition output, in accordance with the present disclosure.

To illustrate the operations performed by the components of the colorimetric analysis system 50, FIG. 3 illustrates an embodiment of a process 80 generating a condition output (e.g., a damage output indicating an amount or occurrence of damage, a degradation output indicating an amount or occurrence of damage, a corrosion output indicating an amount or occurrence of corrosion), such as an alert or a control signal to modify operation of components of the well system 10. Although the process 80 is described as being performed by the processor 60 of the computing device 58, any suitable machine or processor-based device capable of communicating with other components of the colorimetric analysis system 50 may perform the disclosed process 80.

At block 82, the processor 60 receives, acquires, or obtains colorimetric data, sensor data, or colorimetric data associated with a downhole component, subsea component, or other field component. For example, the processor 60 may send a control signal that causes one or more of the optical sensors 52 to activate, thereby obtaining sensor data of a surface portion 54 of the field component 56. In some embodiments, the processor 60 may send one or more control signals to the optical sensors 52 to obtain colorimetric data, sensor data, or colorimetric data corresponding to multiple surface portions 54 (e.g., multiple locations, multiple regions) of one or more field components 56 (e.g., 1, 2, 3, 4, 5, 6, or more field components). For example, the processor 60 may send a first control signal that causes a first optical sensor 52 to obtain a first colorimetric data of a surface portion 54 of a first field component 56. Additionally, the processor 60 may send a second control signal that causes a second sensor 52 to obtain a second colorimetric data of a surface portion 54 of the field component 56. As such, the processor 60 may receive both the first colorimetric data and the second colorimetric data. In some embodiments, the image data may be color images, and thus, each image data may include pixel data having color values corresponding a particular color scale (e.g., International Commission on Illumination (CIE) LAB, a CIE XYZ, CIE LCH, RGB, CMYK, a user-defined custom color scale, and so on). In some embodiments, the image data may be greyscale images, and thus, each image data may include pixel data having a numerical or alphanumerical representation of different intensities in grayscale.

At block 84, the processor 60 determines a color, a color value, or otherwise an alpha-numerical representation of the color corresponding to the surface of the field component 56 downhole component, subsea component, or other field component indicated by the sensor data acquired by the optical sensors 52. For example, the color value may be a numerical representation of the color such as a CIE LAB value, a CIE XYZ value, a CIE LCH value, a red-blue green (RGB) value, a black-white (BW) value, a cyan-magenta-yellow-key (CMYK) value, a Pantone® Matching system (PMS) value, a hexadecimal color (HEX) value, and so on. That is, the color value may include a hexadecimal value and/or coordinates representing a color of the field component 56. For example, an RGB value may include (255, 0, 0) (e.g., in red, green, blue space) or "#FF0000" corresponding to red. It should be noted that any alphanumeric representation of the color may be used.

In some embodiments, the processor 60 may determine the color or the color value required by a colorimetric model. As one-non limiting example, the processor 60 may utilize the International Commission on Illumination (CIE) model (e.g., CIE LAB model, CIE XYZ model, CIE LCH model), the RGB model, and other colorimetric models, to quantitatively determine the color. In general, the CIE model defines a multidimensional space (e.g., 3D model) based on multiple parameters related to luminosity, hue, color, chroma (e.g., related to the intensity and the colorfulness of the color), or a combination thereof. For example, in the CIE LAB model, includes an L* parameter related to the luminosity of the color, an a* parameter related to the red or green component of the color, and a b* parameter related to the yellow or blue component of the color. As another example, in the CIE XYZ model, X, Y, Z, are generally related to the measured transmittance. In any case, the processor 60 may determine a color value may transforming sensor data (e.g., transmittance data, reflectance data, or other measured optical data) using the parameters of the model.

In some embodiments, the processor 60 may determine the color using image data, such as when the field component 56 is at the surface after completing a run. In such an embodiment, the processor 60 may sample (e.g., randomly or semi-randomly select) at least a subset of the pixels of the image data and determining an average color or average color value of at least the subset of pixels.

In some embodiments, the processor 60 may determine a color composite value based on an identified color of multiple surface portions 54 (e.g., the surface portion 54a and the surface portion 54b as described with respect to FIG. 2), such as from a single field component 56 and/or multiple field components 56. In general, the color composite value may represent an average or sum of the colors of multiple surface portions. In an embodiment where the processor 60 determines the color using sensor data, the processor 60 may randomly sample a predetermined number of pixels of the image data, such as 10 or more, 20 or more, 30 or more, 40 or more, 50 or more, 100 or more, random samples. In some embodiments, the processor 60 may identify areas having a color corresponding to corrosion, which may facilitate the identification of corrosion that may otherwise be missed due to averaging. For example, the color blue may correspond to a new surface and the color orange may correspond to an oxidized surface. As such, the processor 60 may determine the color of each portion of a surface or pixel (i.e., when using image data), and if the processor 60 identifies an orange color, the processor 60 may use that color and proceed to block 86. In some embodiments, the processor 60 may determine a location having a color value indicative of a particular condition, which may facilitate identifying locations along the surface of the field component that are degrading or evolving more quickly than others.

At block 86, the processor 60 retrieves the trend data 66 associated with the field component 56, downhole component, subsea component, or another field component. As described herein, the trend data 66 may include a colorimetric profile for a particular type of material of the surface portion, such as graphs, mathematical functions, lookup tables, and models indicating a relationship between the condition and the color of the particular type of material of the surface portion. As such, the relationship may indicate a relationship between an amount of hydrogen sulfide scavenging and the color for the chromium metal and different chromium alloys. In some embodiments, the relationship may indicate the color of the field component 56 compared to an amount of corrosion (e.g., an amount of time downhole) and/or other degradation. The trend data may be stored in the memory 62 or another suitable memory accessible by the processor 60.

At block 88, the processor 60 may determine a condition of the field component 56, downhole component, subsea component, or other field component, based on the determined color (e.g., at block 84) and the trend data (e.g., retrieved at block 86). In general, the condition corresponds to the change in the optical properties (e.g., color) of the surface portion 54 of the field component 56. In general, the change in optical properties may indicate an amount of corrosion of the surface portion 54 of the field component 56 and/or a functional lifetime of the field component 56 based on the retrieved trend data 66 and/or the reference sensor data 68 obtained at block 82. As described herein, the functional lifetime of the field component 56 is indicative of the amount of use (e.g., a number of runs) of the field component 56, such as the time period field component 56 has been used, a remaining time period for field component 56, a number of runs performed using the field component 56, a number of remaining runs for using the field component 56, or a combination thereof.

As one non-limiting example of a use case, the colorimetric analysis system 50 may acquire optical property data of a surface portion 54 including copper oxide that has potentially been oxidized due to exposure to fluids as discussed herein, or as other example iron, nickel and/or molybdenum sulfides that are formed on steels and/or nickel alloys. The optical property data may be an obtained spectra or an image of the surface portion 54 associated with a different color than reference sensor data 68 corresponding to measurement of the surface portion 54 taken during earlier time period.

At block 90, the processor 60 generates a condition output based on the condition of the surface portion 54 of the field component 56. In general, the condition output may be an alert indicative of the remaining functional lifetime and/or an amount of corrosion of the field component 56 and/or a control signal that modifies operation of the field component 56. For example, the condition output may cause the processor 60 to halt operation of a field component. For example, the colorimetric analysis system 50 may determine the surface portion 54 has been exposed to fluids if the surface portion 54 has a color value (e.g., CIE LAB) of a particular color indicating that at least a portion of the copper in the surface portion 54 has oxidized.

In general, the condition output may include an audible and/or visual alert (e.g., a notification displayed on a computing device, such as a laptop, mobile device, tablet, or otherwise) or cause a component of the well system 10 to modify operation. For example, the condition output may be a control signal or activation signal that causes a device corresponding to the detected color of the surface portion 54 to stop operating or change operation or position. As another non-limiting example, the control signal may cause a drill to stop drilling, a valve to open or close, and/or a fluid flow rate to change. In some embodiments, the damage output may be an indication or alert displayed on a computing device, indicating a likelihood that the field component 56 (e.g., a fluid handling component, a mineral extraction component, a hydrocarbon extraction component, a gas sequestration component, a water injection or any combination thereof) has been exposed to certain fluids (e.g., corrosive fluids, acid gases, etc.). In some embodiments, the notification may indicate a magnitude of the exposure (e.g., based on the change in the optical properties). For example, the alert may warn a user that the field component was likely damaged as well as the extent of the damage (e.g., determined based on a magnitude change or the location of the change in optical properties). In some embodiments, the colorimetric analysis system 50 may determine an estimated time period for subsequent use of the field component 56 corresponding to the surface portion 54 prior to inspection, repair, or replacement. For example, the colorimetric analysis system 50 may use a reference table (e.g., storing relationships between a magnitude of exposure and a time for replacement or maintenance) stored in a memory and the magnitude of the exposure to determine the estimate time period. As such, the colorimetric analysis system 50 may include the estimated time period in the notification or alert.

In some embodiments, the processor 60 may use reference sensor data 68 to generate the condition output. For example, the processor 60 may determine that the surface portion 54 has been exposed to fluids if a percentage of the surface portion 54 (e.g., percentage of the pixels of image data or percentage of obtained sensor data) having a color corresponding to corrosion of the field component 56 is above a dimension or area threshold. Additionally, or alternatively, the colorimetric analysis system 50 may determine that the surface portion 54 has been exposed to fluids based on a comparison of the brightness to one or more brightness thresholds (e.g., a determined parameter corresponding to luminosity or lightness exceeds a background luminosity or lightness threshold). In certain embodiments, the colorimetric analysis system 50 may compare the detected color to a reference color value (e.g., a CIE LAB color value indicating a color of the surface portion 54) and obtain a color comparison, compare the detected dimensions of the surface portion 54 to a reference area (e.g., reference sensor data 68 corresponding to a previously obtained sensor data of the surface portion 54) and obtain a dimensional comparison, compare the detected brightness to a brightness threshold and obtain a brightness comparison, or any combination thereof. The color comparison, the dimensional comparison, and the brightness comparison may be used alone or in combination with one another to obtain a condition analysis, which may be indicative of certain conditions on the surface portion 54. The color comparison may indicate a color discrepancy or difference between the detected color and the reference color value, the dimensional comparison may indicate a dimensional discrepancy or difference between the detected dimensions and the reference area, and the brightness comparison may indicate a brightness discrepancy or difference between the detected brightness and the brightness threshold. Individually or collectively, the foregoing discrepancies or differences may be used to obtain the condition analysis. If the discrepancy (i.e., individually or collectively) exceeds a threshold (e.g., 10%, 20%, 30%, 40%, 50%, 60%, 70%, 80%, 90%, 100%), the colorimetric analysis system 50 may determine the optical properties of the surface portion 54 have changed, and thus, the field component 56 has been exposed to corrosion, chemical scavenging, and/or moisture exposure.

In some embodiments, the processor 60 may use trend data 66 and to generate the condition output. For example, the processor 60 may compare the detected color to a colorimetric profile corresponding to the material of the surface portion 54 of the field component 56. As described herein, the colorimetric profile may be a graphical representation indicating the color of the surface portion 54 versus an amount of exposure to a fluid. As such, the processor 60 may use the colorimetric profile to determine the amount of exposure based on the detected color. Additionally, or alternatively, the processor 60 may determine, based on the detected color, a remaining functional lifetime of the field component use the colorimetric profile, as described in more detail with respect to FIGS. 4-6.

Figure 4:
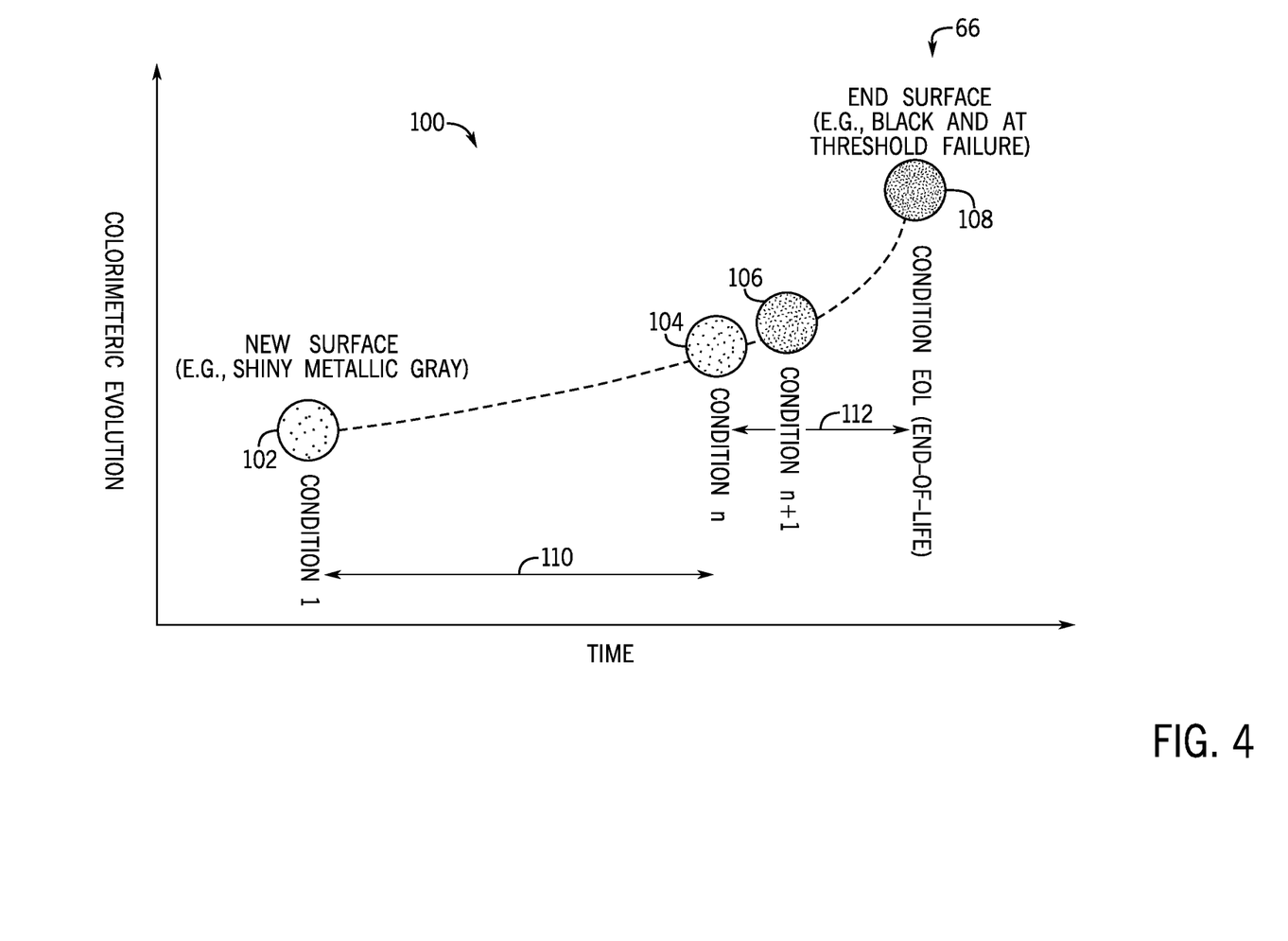
FIG. 4 is a first example of a colorimetric profile that is a graph depicting colorimetric evolution versus time, in accordance with the present disclosure.

FIG. 4 is a first example of trend data 66 (e.g., a colorimetric profile) that is a graph with a horizontal or x-axis representing time (e.g., a time during the functional lifetime) and a vertical or y-axis representing a colorimetric evolution for a first example of exposure to a harsh environment, such as an acidic environment, an environment with hydrogen sulfide, and so on. The graph of FIG. 4 includes a curve 100 corresponding to the field component 56. In the depicted example, the curve 100 includes a first value 102, a second value 104, a third value 106, and fourth value 108 that generally indicate how the color of the field component 56 is related to the functional lifetime of the field component 56. The values 102, 104, 106, and 108 may correspond to color values, such as CIE LAB color values, CIE XYZ color values, CIE LCH color values, RGB color values, CMYK color values, HIS color values, YUV color values, or any combination thereof. For example, the first value 102 includes a first color (e.g., grey color having a first brightness) corresponding to a shiny metallic surface. In this example, the shiny metallic surface indicates that the field component 56 is a relatively new or unused (e.g., an initial or first condition of the field component 56). The second value 104 includes a second color (e.g., a gray color) corresponding to the field component 56 after a first period of uses (e.g., runs). Accordingly, if the processor 60 receives colorimetric data indicating the color of the first value 102, the processor 60 may determine that the field component 56 is relatively new or unused. In a generally similar manner, if the processor 60 receives colorimetric data indicating the color of the second value 104, then the processor may determine that the field component 56 has been used for the first time period 110 of uses. The third value 106 includes a third color corresponding to the oil field component 56 after a third period of uses (e.g., runs). The fourth value includes a black color corresponding to the field component 56 when it may no longer be used (e.g., is in need of repair). It should be noted that any values between or in addition to these four values may be used for analysis purposes. That is, the graph could be used to identify any color along the graph, thereby enabling the processor to determine the condition and/or functional lifetime of the field component 56. In general, the slope of the curve 100 between the first value 102 and the second value 104 is generally linear and increases at a first rate. However, the slope of the curve 100 from the second value 104 to the third value 106 increases at a second rate that is greater that the first rate. Moreover, the slope of the curve 100 from the third value 106 to the fourth value 108 increases at third rate that is greater than the second rate. As such, if the processor 60 receives colorimetric data indicating the color of the second value 104, then the processor may determine, additionally or alternatively, that the field component 56 will fail or need to be replaced after a second period of uses 112. In this way, trend data 66 may be used to determine the functional lifetime, or the remaining period of uses, of the field component 56.

Figure 5:
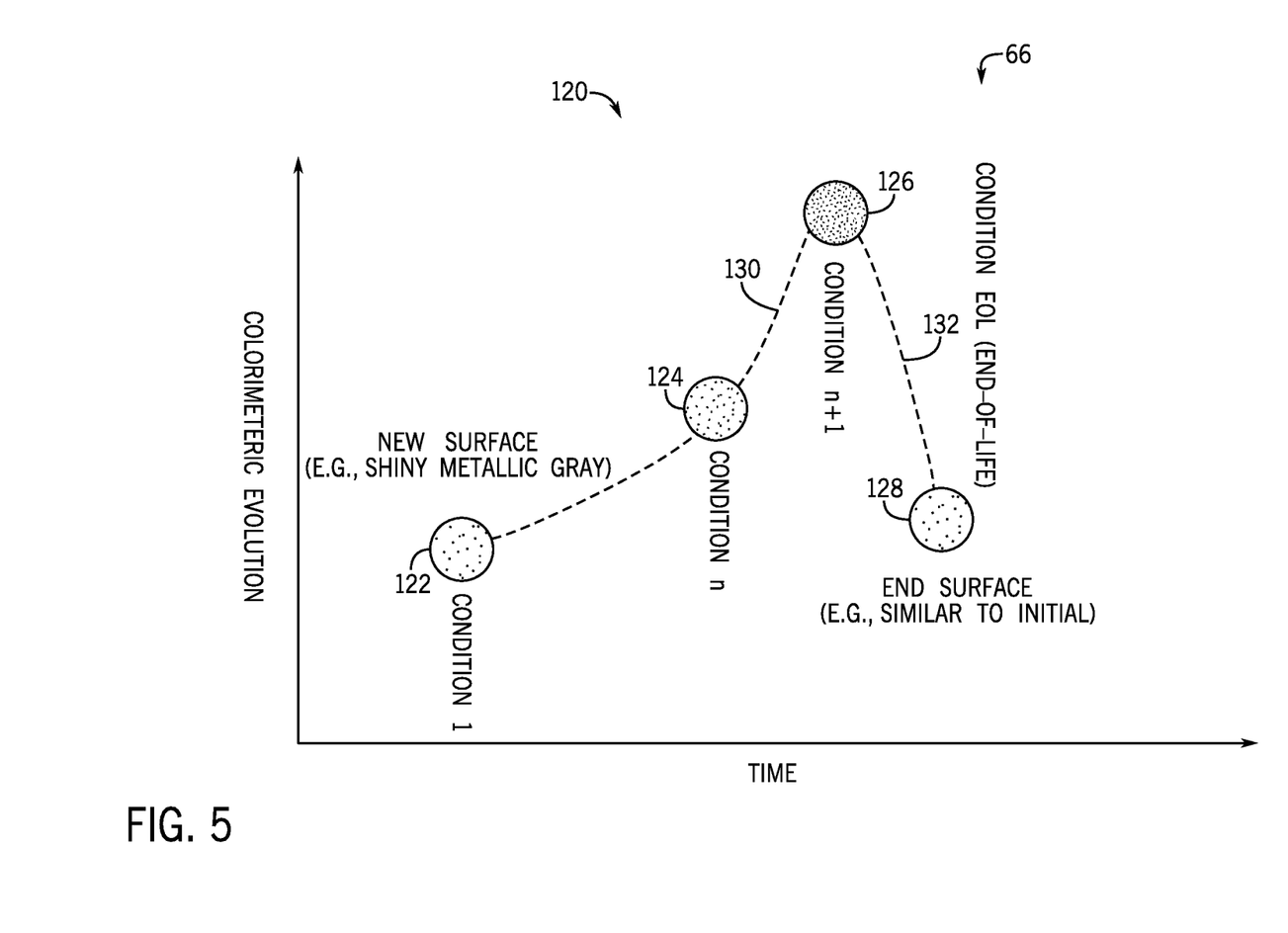
FIG. 5 is a second example of a colorimetric profile that is a graph depicting colorimetric evolution versus time, in accordance with the present disclosure.

FIG. 5 is a second example of trend data 66 (e.g., a colorimetric profile) that is a graph with a horizontal or x-axis representing time (e.g., a time during the functional lifetime) and a vertical or y-axis representing colorimetric evolution for a second example of exposure to a harsh environment. The graph of FIG. 5 includes a curve 120 corresponding to the field component 56. In the depicted example, the curve 120 is generally bell-shaped. That is, moving along the curve 120 from the first value 122 to the second value 124 into the third value 126, the curve 120 generally increases. However, moving along the curve 120 from the third value 126 to the fourth value 128, the curve generally decreases. In a generally similar manner as described above with respect to FIG. 4, each value (e.g. the first value 122, the second value 124, the third value 126, and the fourth value 128) corresponds to a different color of the field component 56 during the functional lifetime of the field component 56. The values 122, 124, 126, and 128 may correspond to color values, such as CIE LAB color values, CIE XYZ color values, CIE LCH color values, RGB color values, CMYK color values, HIS color values, YUV color values, or any combination thereof. However, as the curve 120 is a bell-shape curve, it should be noted that there may be two time periods (e.g., along the x-axis) on either side of the third value 126 (e.g., corresponding to the peak of the bell-shape curve) having the same color, such as value 130 and value 132. As such, if the processor 60 only receives the color corresponding to the value 130, the processor 60 may be unable to determine whether the functional lifetime of the field component 56 is at the time period corresponding to the value 130 or the value 132. Accordingly, the processor 60 may retrieve reference sensor data 68 corresponding to sensor data measured at a previous time period, such as the time period corresponding to the value 124. In turn, the processor 60 may be able to determine that the functional lifetime of the field component 56 is at the time period corresponding to the value 130 based on the time period corresponding to the value 124. In this way, trend data 66 such as a colorimetric profile, may be used to determine the functional lifetime of the field component 56 despite ambiguity in a detected color of the field component 56. That is, by using previously acquired colorimetric data (e.g., the reference sensor data 68), the processor 60 may be capable of accurately determining the functional lifetime of the field component 56. For example, the processor 60 may utilize the trend data 66 to determine a slope along the colorimetric profile at a particular determined color value, which may facilitate determining a condition of the field component. The sign of the slope (e.g., positive or negative) may indicate whether the component is nearing the end of its lifetime. As such, the processor 60 may determine the slope to determine the condition of the field component 56.

Figure 6:
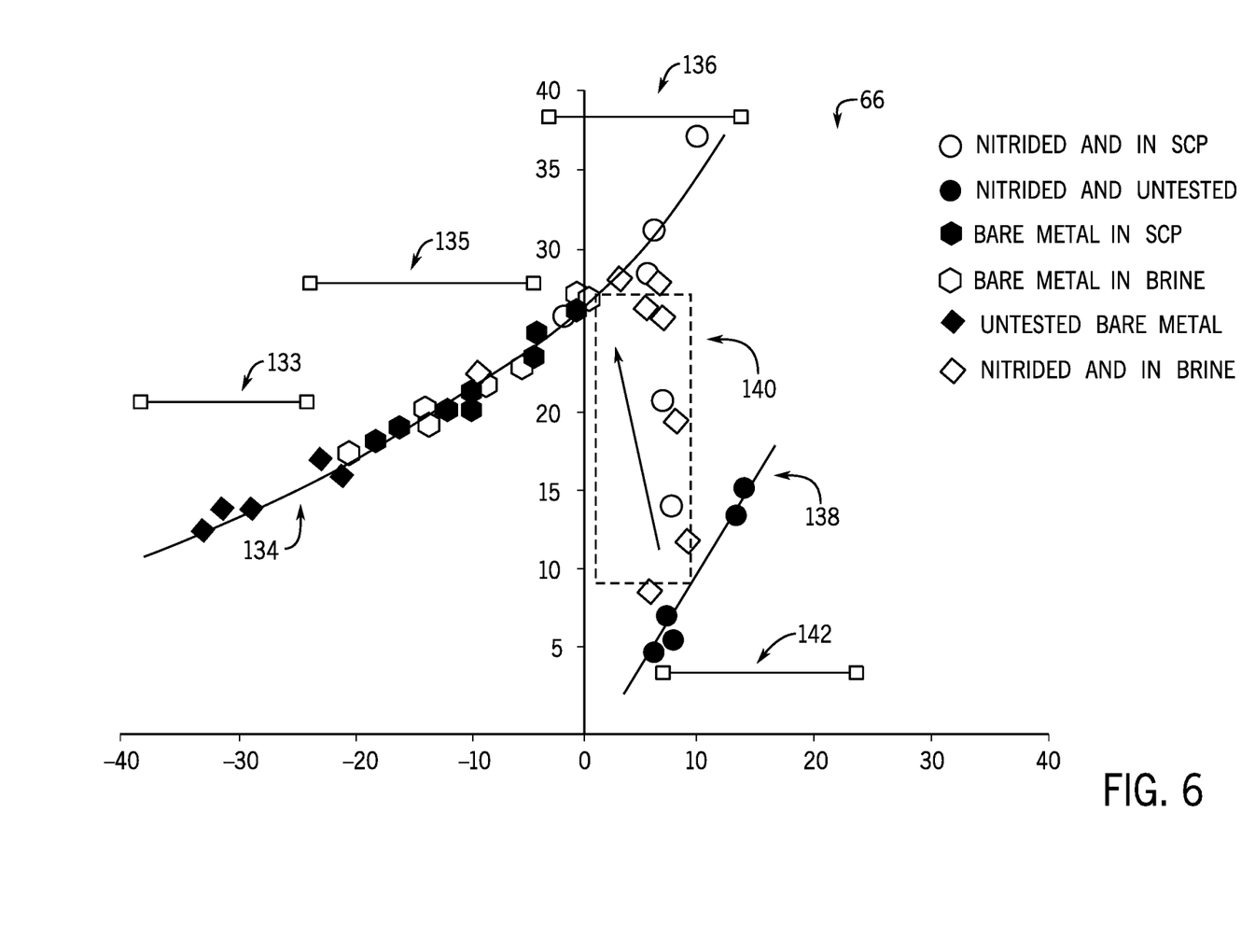
FIG. 6 is an example of a colorimetric profile that is a graph include multiple trends, in accordance with the present disclosure.

FIG. 6 is an example of trend data 66 (e.g., a colorimetric profile) that includes multiple trends corresponding to different fluid exposures impacting surface changes (e.g., corrosion or degradation). In particular, the trend data 66 includes a first trend 134 corresponding to the changing color of the surface portion 54 of the field component 56 as the field component 56 is exposed to different conditions at different times. For example, the range 133 along the first trend 134 corresponds to the field component 56 having a surface portion 54 that includes bare-metal. The range 135 along the first trend 134 corresponds to the bare-metal of the field component 56 being exposed to brine or a sustained casing pressure (SCP). However, at the range 136, the trend data 66 moves from the first trend 134 to the second trend 138 within an intermediate portion 140. The range 142 along the second trend 138 corresponds to the field component 56 having a nitride-containing surface that is unexposed (e.g., not in brine or SCP). The range 136, which partially overlaps with both the first trend 134 and the second trend 138, corresponds to the field component having the nitride-containing surface being exposed to brine or SCP. In general, the trend data 66 of FIG. 6 illustrates trend data 66 that may be used by the processor 60 to determine the composition of the surface portion 54 of the field component 56, which may be useful for determining exposure of the field component 56 as described in more detail below.

More specifically, the second trend 138 corresponds to new and/or unused nitrided alloys of nickel such as Alloys 925 (UNS N09925), 718 (UNS N07718), and the like listed in NACE MR0175/ISO 15156 (latest edition). As corrosion develops and increases, the nitrided layer is converted into corrosion products, leading to the nitriding layer to fall off and expose the metallic surface underneath. The new color of the corroded nitrided nickel alloys follows the first trend 134, also representative of new and corroded alloy surfaces. As such, when the processor 60 determines the color of the field component 56 moves from following the second trend 138 to the first trend 134, the processor 60 determine the condition of the nitrated surface. Put differently, if the processor 60 measures a color corresponding to a value along the second trend 138, the processor 60 may determine that the nitrided surface of the field component is relatively new. However, if the processor 60 measures a color corresponding to a value along the first trend 134, the processor 60 may determine that the field component 56 is damaged.

Figure 7:
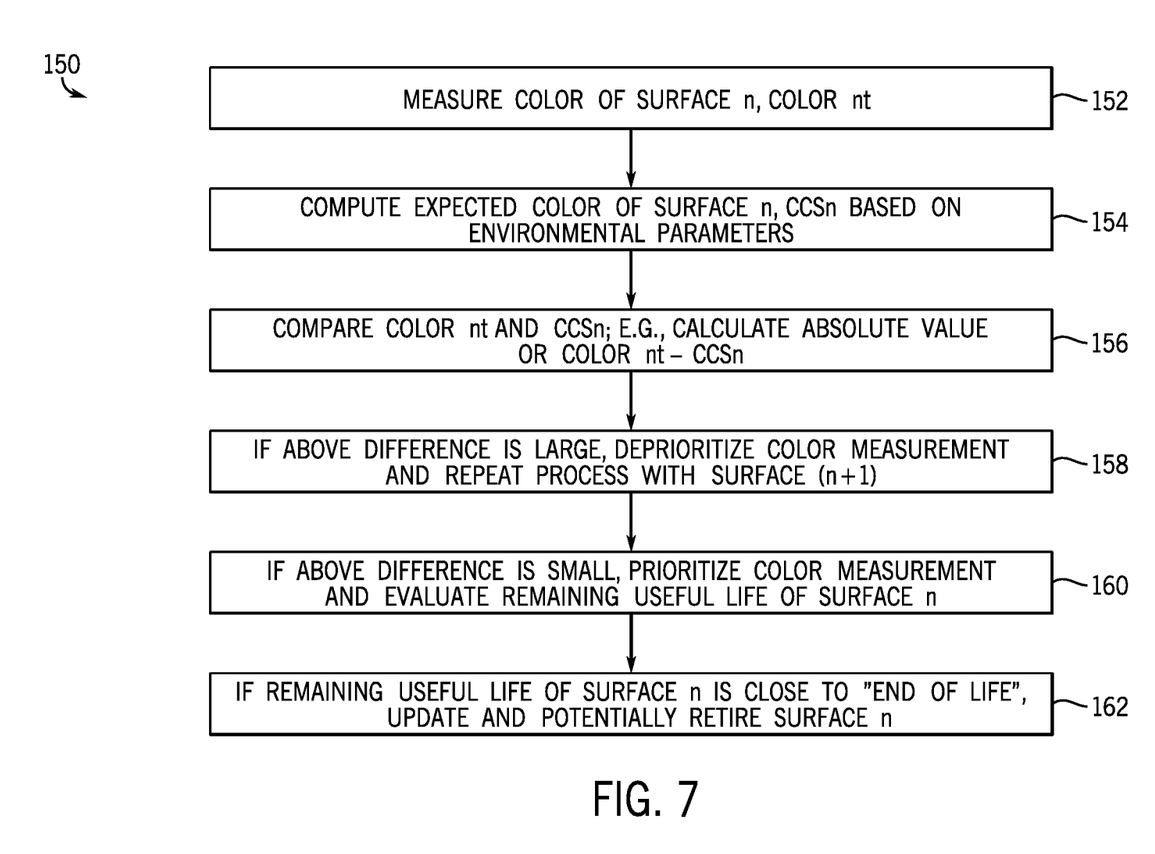
FIG. 7 is a flow diagram of an embodiment of a process for determining a functional lifetime of a field component based on colorimetric data, in accordance with the present disclosure.

As described herein, the trend-based analysis techniques may include determining a condition output that may include a determined functional lifetime. To illustrate this, FIG. 7 is a flow diagram of an embodiment of a process for determining a functional lifetime of a field component based on colorimetric data. Although the process 150 is described as being performed by the processor 60 of the computing device 58, any suitable machine is processor-based device capable of communicating with other components of the colorimetric analysis system 50 may perform the disclosed process 150.

At block 152, the processor 60 may measure a color of the surface portion 54. In general, the processor 60 may perform block 152 in a similar manner as described with respect to block 82 of FIG. 3. At block 154, the processor may compute an expected color of the surface portion 54 based on environmental parameters 70. As described above with respect to FIG. 2, the environment parameter 70 may generally indicate a composition and/or identity of fluids that may be present within a geological formation 16. For example, the environmental parameters 70 may indicate that a geological formation 16 includes a reservoir with a brine fluid. Accordingly, the processor 60 may determine the expected color based on exposure of the surface portion to the brine fluid. For example, as described above with respect to FIG. 6, the processor 60 may be able to determine an expected change of color of the field component 56 upon exposure to the brine fluid.

At block 156, the processor may compare the color (e.g., measured at block 152) to the expected color of the surface portion 54. In general, the processor 60 may determine whether discrepancy exists between the color of the surface portion 54 measured at block 152 and the expected color of the surface portion 54 determined or estimated at block 154. A block 158 the processor 60 may determine whether the discrepancy between the color of the surface portion 54 measured at block 132 and the expected color of the surface portion 54 determined or estimated at block 154 is above a threshold. If the discrepancy is above the threshold, the processor 60 may proceed to block 158 and measure the color of a surface of a different field component 56.

However, if the discrepancy is below the threshold, the processor 60 may, at block 160, prioritize color measurement and evaluate a remaining useful life of surface. For example, the processor 60 may determine the functional lifetime of the field component 56. At block 162, the processor 60 may determine whether the useful life or functional lifetime of the field component 56 is close to an "end of life". For example, the processor 60 may determine whether the functional lifetime is above or less than the threshold. If the functional lifetime of the field component 56 is less than the threshold, indicating that the field component 56 should be repaired sooner than expected, the processor 60 may output a condition output, such as an alert or a control signal that halts operation with the field component 56. However, if the functional lifetime of the field component 56 is greater than the threshold, the processor 60 may output a condition output that indicates the determined functional lifetime. Additionally, or alternatively, the processor 60 may provide an alert to a user to update environmental parameters 70 associated with the geological formation 16.

Technical effects of the disclosed embodiments may include obtaining colorimetric data of a surface (e.g., coating and/or material surface) of a mechanical component, evaluating the colorimetric data against reference colorimetric data, and obtaining a condition of the mechanical component (e.g., surface condition) based on the evaluation. The colorimetric data may include a measured spectrum of the surface. In an embodiment where the sensor data includes image data, the image data may include a digital photograph or image of the surface, which can be analyzed to determine colors and/or optical properties of the surface. The reference colorimetric data may indicate colors and/or optical properties according to various types of conditions on the surface, such as exposure to corrosive fluids, damage from corrosion, types of corrosions, and/or any surface conditions impacting the functional lifetime of the mechanical component. For example, the reference colorimetric data may indicate a trend of the colors and/or optical properties (e.g., colorimetric evolution) over time as the surface is exposed to certain fluids. By comparing a currently detected color and/or optical properties to the reference colorimetric data, the disclosed embodiment can provide an indication of the conditions on the surface and/or remaining functional lifetime of the mechanical component. The foregoing techniques can be used while a system (e.g., oil and gas system) is operating, thereby avoiding downtime while providing useful conditional data about various mechanical components.

This written description uses examples to disclose the subject matter, including the best mode, and also to enable any person skilled in the art to practice the subject matter, including making and using any devices or systems and performing any incorporated methods. The patentable scope of the subject matter is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is

The invention claimed is:

1. A method, comprising:
receiving, via one or more processors, colorimetric data of a field component, wherein the colorimetric data corresponds to a portion of the field component or an integrity of a surface of the field component;
determining, via the one or more processors, a color value associated with the surface at a first time period;
retrieving, via the one or more processors, trend data indicating relationships between a plurality of color values and a plurality of conditions corresponding to the field component, and wherein the trend data comprises a colorimetric profile having at least a first portion with a positive slope, an intermediate point, and a second portion with a negative slope;
receiving, via the one or more processors, a previous color value associated with the surface at a second time period that is before the first time period;
determining, via the one or more processors, that the color value corresponds to the first portion, the intermediate point, or the second portion based on the previous color value and the colorimetric profile;
determining, via the one or more processors, a condition of the plurality of conditions corresponding to the field component based on the color value corresponding to the first portion, the intermediate point, or the second portion;
generating, via the one or more processors, a condition output based on the determined condition of the field component; and
outputting, via the one or more processors, a control signal based on the condition output, wherein the control signal is configured to adjust operation of a valve of the field component, a drill of the field component, or both based on the condition output.

2. The method of claim 1, comprising determining the condition of the field component based on the trend data, the color value, and reference colorimetric data indicating a previous colorimetric value associated with the surface.

3. The method of claim 1, wherein the intermediate point comprises a discontinuity or an inflection point.

4. The method of claim 1, wherein the trend data indicates a linear trend or a non-linear trend of the plurality of color values corresponding to the surface of the field component and corrosion of the field component.

5. The method of claim 1, wherein the surface of the field component comprises carbon and low alloys steels, stainless steels, nickel alloys, titanium alloys, copper alloys, nitrided alloys, metallic coatings, polymer coatings, ceramic coatings, and combination thereof.

6. The method of claim 1, wherein the colorimetric data is indicative of multiple locations of the field component or field components from the same tool string.

7. The method of claim 1, wherein the condition output comprises a remaining number of uses of the field component.

8. The method of claim 1, wherein determining, via the one or more processors, the condition of the plurality of conditions correspond to the field component based on the trend data and the color value comprises determining a change in the color of the field component.

9. The method of claim 1, comprises at least one of a CIE LAB color value, a CIE XYZ color value, a CIE LCH color value, a RGB color value, a CMYK color value, a grayscale color value, a HEX color value, or a combination thereof.

10. A method, comprising:
obtaining, via one or more processors, sensor input corresponding to a component at a first time period, wherein the sensor input indicates a color value of a portion of the component or integrity of a surface of the component;
retrieving, via the one or more processors, trend data indicating relationships between a plurality of color values and a plurality of conditions corresponding to the field component, and wherein the trend data comprises a colorimetric profile having at least a first portion with a positive slope, an intermediate point, and a second portion with a negative slope;
obtaining, via the one or more processors, a second sensor input of a previous color value of the surface of the component at a second time period that is before the first time period;
determining, via the one or more processors, that the color value corresponds to the first portion, the intermediate point, or the second portion based on the previous color value and the colorimetric profile;
identifying, via the one or more processors, a condition of the surface of the component based on the color value corresponding to the first portion, the intermediate point, or the second portion; and
outputting, via the one or more processors, a control signal based on the condition, wherein the control signal is configured to adjust operation of a valve of the field component, a drill of the field component, or both based on the condition output.

11. The method of claim 10, comprising determining, via the one or more processors, the color value according to a color of the surface.

12. The method of claim 11, wherein the color value comprises at least one of a CieLAB color value, RGB color value, a CMYK color value, a grayscale color value, a HEX color value, or a combination thereof.

13. The method of claim 10, wherein the color reference comprises a lookup table, an equation, a computer model, a graph, or a combination thereof, correlating colors to conditions of the surface.

14. The method of claim 10, comprising identifying, via the one or more processors, a trend in the color over time, and further comparing, via the one or more processors, the trend against one or more trends in the color reference.

15. The method of claim 10, wherein the condition includes an exposure, a degree of degradation, and/or a type of degradation associated with a harsh environment contacting the surface of the component.

16. The method of claim 15, wherein the degree of degradation includes a duration of time the surface is corroding due to the harsh environment, and the type of degradation includes a type of corrosion.

17. The method of claim 15, wherein the harsh environment includes a single or multi-phase corrosive fluid comprising water with one or more among salts, chlorides, acids, hydrogen sulfide, carbon dioxide, oxygen, either dissolved in a brine or supercritical phase.

18. A system, comprising:
a controller having one or more processors configured to:
obtain a first sensor input of a color value of a surface of a component at a first time period;
retrieve trend data indicating relationships between a plurality of color values and a plurality of conditions corresponding to the field component, and wherein the trend data comprises a colorimetric profile having at least a first portion with a positive slope, an intermediate point, and a second portion with a negative slope;
obtain a second sensor input of a previous color value of the surface of the component at a second time period that is before the first time period;
determine that the color value corresponds to the first portion, the intermediate point, or the second portion based on the previous color value and the colorimetric profile;
identify a condition of the plurality of conditions corresponding to the surface of the component based on the color value corresponding to the first portion, the intermediate point, or the second portion; and
output a control signal based on the condition, wherein the control signal is configured to adjust operation of a valve of the field component, a drill of the field component, or both based on the condition output.

19. The system of claim 18, wherein the controller is configured to determine a color value according to the color of the surface, wherein the condition includes an exposure, a degree of degradation, and/or a type of degradation associated with a harsh environment contacting the surface of the component.

20. The system of claim 18, wherein the controller is configured to identify a trend in the color over time, and further compare the trend against one or more trends in the plurality of reference colors.

* * * * *